United States Patent [19]
Purkett

[11] Patent Number: 5,760,993
[45] Date of Patent: Jun. 2, 1998

[54] INFORMATION STORAGE DEVICE WITH AN ODD NUMBER OF TRACK SEQUENCES IN A ZONE

[75] Inventor: John Charles Purkett, Longmont, Colo.

[73] Assignee: International Business Machines Corporation, Armonk, N.Y.

[21] Appl. No.: 572,388

[22] Filed: Dec. 14, 1995

[51] Int. Cl.$^6$ ................................................ G11B 5/596
[52] U.S. Cl. ............................... 360/78.08; 360/48
[58] Field of Search .................... 360/75, 7, 78.04, 360/78.08, 48; 369/58, 47

[56] References Cited

U.S. PATENT DOCUMENTS

| | | | |
|---|---|---|---|
| 3,997,876 | 12/1976 | Frush | 340/172.5 |
| 4,414,589 | 11/1983 | Oliver et al. | 360/77 |
| 4,504,873 | 3/1985 | Bandy et al. | 360/63 |
| 4,575,775 | 3/1986 | Albrecht | 360/77 |
| 4,680,703 | 7/1987 | Kriz | 364/200 |
| 4,682,121 | 7/1987 | Chapman | 331/1 A |
| 4,724,495 | 2/1988 | Hedberg et al. | 360/48 X |
| 4,736,341 | 4/1988 | Redmond et al. | 364/900 |
| 4,796,113 | 1/1989 | Hayakawa | 360/48 X |
| 4,858,034 | 8/1989 | Hassel et al. | 360/51 |
| 4,872,070 | 10/1989 | Cooper et al. | 360/15 |
| 4,979,054 | 12/1990 | McCullough et al. | 360/48 |
| 5,005,089 | 4/1991 | Thanos et al. | 360/77.08 |
| 5,084,791 | 1/1992 | Thanos et al. | 360/77.04 |
| 5,157,770 | 10/1992 | Beardsley et al. | 395/275 |
| 5,187,620 | 2/1993 | Notake et al. | 360/77.04 |
| 5,193,036 | 3/1993 | Green et al. | 360/78.14 |
| 5,196,970 | 3/1993 | Seko et al. | 360/77.03 |
| 5,202,799 | 4/1993 | Hetzler et al. | 360/48 |
| 5,255,136 | 10/1993 | Machado et al. | 360/77.02 |
| 5,280,603 | 1/1994 | Jeppson et al. | 395/425 |
| 5,293,565 | 3/1994 | Jaquette et al. | 360/48 X |
| 5,523,903 | 6/1996 | Hetzler et al. | 360/48 X |
| 5,583,712 | 12/1996 | Brunelle | 360/77.07 |

FOREIGN PATENT DOCUMENTS 0569718  11/1993  European Pat. Off. ......... G11B 7/14

OTHER PUBLICATIONS

IBM Technical Disclosure Bulletin, vol. 34, No. 4B, Sep. 1991, pp. 4–6, entitled "Digital Da Detector for Computer Systems" by J. F. Holsteen, Jr.

IBM Technical Disclosure Bulletin, vol. 37, No. 05, May 1994, p. 561, entitled "Read/Write Offset Measurement by Head Switching" by Y. Ozawa.

IBM Technical Disclosure Bulletin, vol. 17, No. 05, pp. 1460–1463, entitled "Logical Sector Interleave" by J. E. Guest, R. W. King, and R. C. Kiscaden.

(List continued on next page.)

*Primary Examiner*—Andrew L. Sniezek
*Attorney, Agent, or Firm*—Richard E. Billion; Owen J. Gamon

[57] ABSTRACT

A zoned sequential track format is shown and described which reduces the number of head switches during disk drive read/write operations. A band of selected tracks that form a data recording zone or a portion of such a zone are organized into an odd number of track sequences with each sequence being resident on a single disk surface. In the embodiment of a drive with an even number of data surfaces, the tracks within the band on one surface are partitioned to form two track sequences. This can readily be accomplished using 2-cylinder skipping to have each sequence contain alternate tracks across the band. By having each track sequence accessed during a generally radial passage of the transducer over the band, the odd number of track sequences causes the transducers to be adjacent the next successive band when the last track sequence of the current band has been accessed. Incrementing between bands is effected by an access between tracks on the same data surface. Similarly, in devices that sequentially access the tracks within a cylinder of tracks, the disk data surfaces are accessed in reverse order during alternate cylinder accesses. This enables incrementing between cylinders with only a one track seek and no head switch.

1 Claim, 13 Drawing Sheets

OTHER PUBLICATIONS

IBM Technical Disclosure Bulletin, vol. 31, No. 8, Jan. 1989, pp. 75–82, entitled "Hardware (Lo) Control of Head-switch for a Hard Magnetic Disk File With Enhanced Small Device Interface" by C. A. Anderson, W. J. Hunt and C. D. Ruemping.

IBM Technical Disclosure Bulletin, vol. 36, No. 09A, Sep. 1993, pp. 117–118, entitled "Secto Shifting to Minimize Disk Drive Track Skew" by C. A. Anderson et al.

IBM Technical Disclosure Bulletin, vol. 18, No. 07, pp. 2292–2293, entitled "Eliminating Data Interleaving in Two Head Per Arm Disk Files" by D. E. Gold.

IBM Technical Disclosure Bulletin, vol. 15, No. 5, Oct. 1972, pp. 1705–1706, entitled "Key–Dir Interleave" by J. Parkinson.

IBM Technical Disclosure Bulletin, vol. 32, No. 11, Apr. 1990, pp. 85–92, entitled "Record Mode Extension to Track Mode Caching DASD Subsytem" by V. J. Legvold et al.

| cylinder | 0 | 1 | 2 | 3 | ... | 157 | 158 | 159 | ... | 1881 | 1882 | 1883 |
|---|---|---|---|---|---|---|---|---|---|---|---|---|
| head 0 track | 0 | 2 | 4 | 6 | ... | 314 | 316 | 318 | ... | 3762 | 3764 | 3766 |
| head 1 track | 1 | 3 | 5 | 7 | ... | 315 | 317 | 319 | ... | 3763 | 3765 | 3767 |

Conventional track format example using prior art

FIG. 2 (PRIOR ART)

| cylinder | 0 | 1 | 2 | 3 | ... | 157 | 158 | 159 | ... | 1881 | 1882 | 1883 |
|---|---|---|---|---|---|---|---|---|---|---|---|---|
| head 0 track | 0 | 1 | 2 | 3 | ... | 157 | 158 | 159 | ... | 1881 | 1882 | 1883 |
| head 1 track | 3767 | 3766 | 3765 | 3764 | ... | 3610 | 3609 | 3608 | ... | 1886 | 1885 | 1884 |

Sequential track format example using prior art

FIG. 3 (PRIOR ART)

| band | --------- 1 --------- | --- 2 --- | ... | --- 8 --- |
|---|---|---|---|---|
| cylinder | 0 1 2 3 ... 157 158 | 159 160 161 | ... | 1882 1883 |
| head 0 track | 0 239 1 240 ... 317 79 | 318 465 319 | ... | 3767 3567 |
| head 1 track | 238 237 236 235 ... 81 80 | 464 463 462 | ... | 3569 3568 |

Zoned-Sequential track format example

Zoned-Sequential example (4 surfaces, band 1 split)

```
band    |------- 1 -------|--- 2 --|- 3 -|-...    ---|- 8 -|
head 0  start              end       end              last
     1  *----->            ---->    --->          ---->
     2  <-----V            <---V    <---          <---V
     3  ----->V            --->V    --->          ---->V
     4  <-----V            <---V                  <---V
     5  ----->V            --->V                  ---->V
```

Zoned-Sequential example (5 surfaces, band 1 split)

FIG. 6

```
band  |------ 1 ------|------ end ------|------ 2 ------|--- 3 -|--- ... ---|--- 8 -|
head 0   *------>        ------>           ------>         --->                --->
     1   <-----         <------           <-----         <---          <---  <---
     2   V------>        V------>          V------>        V--->         V---> V--->
     3   <-----         <------           <-----         <---          <---  <---
     4   V------>        V------>          V------>        V--->         V---> V--->
                              end                end
     5   <-------------------------------------------------------------------- last
```

FIG. 7

Zoned-Sequential example (6 surfaces, band 1 split)

INFORMATION STORAGE DEVICE WITH AN ODD NUMBER OF TRACK SEQUENCES IN A ZONE

FIELD OF THE INVENTION

The invention pertains to rotating disk type data storage devices and more particularly to head arrangement and sequencing which enhances the data transfer rate.

BACKGROUND OF THE INVENTION

The performance of hard disk drives is subject to continuous improvement to enable the design of progressively larger storage capacities and more rapid data processing. This must be accomplished within the confines of fixed form factors. These form factors have become smaller with the sequence of 5¼ inch drives, 3½ inch drives and finally to the presently available PCMCIA drives that include a standard with an overall device height of 5 mm. With increasing track density, the advent of portable disk drives and continuing cost reduction efforts, the distance to move from head-to-head is larger than the distance from cylinder-to-cylinder on the same data surface. This is especially true for portable drives, where it is desirable to allow for head-to-head mechanical tolerances of up to 2000 microinches, such as may occur after a tolerable shock event such as an "acceptable" drop of the device. In general, the present invention is progressively more useful as track pitch increases beyond 5000 tpi with head-to-head distances of 175 microinches.

The sequence of data tracks recorded on a disk drive have typically been arranged in order of increasing cylinder, and tracks assigned to sequential heads on each cylinder. This track layout requires a head switch for each track switch, meaning that the next read/write head is selected, and position offset movement performed if necessary. The amount of time required to complete a head switch contributes significantly to the amount of format skew used. Larger skew time allows for increased track switch time, but reduces the average transfer rate on sequential or long random operations.

In disk drives with multiple data disks, the sequence of data tracks recorded on a disk drive has typically been arranged in order of increasing head number on each cylinder, returning to head 0 at each cylinder boundary. Given this arrangement, the head-to-head switch distances are a fraction of the total mechanical offsets in the head/disk stack, but the head switch and cylinder increment from the last head on cylinder "n" to the first head on cylinder "n+1" may require movement of several cylinders in distance. The amount of time required to complete a head switch or cylinder increment is accounted for in the data format with track skew and cylinder skew. These are rotational offsets which allow the actuator to be repositioned when the read write operation spans a track boundary. Thus if the head skew and cylinder skew times require ¹⁄₁₆ revolution and ⅛ revolution, then it will take 8+(7×¹⁄₁₆)+(1×⅛)=8.5625 revolutions to read or write an entire cylinder of an 8 surface disk drive. To obtain enhanced performance, it is desirable to minimize the head-to-head and cylinder increment distances to maximize the average data transfer rate.

In a typical single disk drive, using a conventional track format, each track switch requires a head switch operation, with head 1 to head 0 also incrementing the cylinder. An alternative format is also currently in use today in some drives, is referred to as sequential track format, wherein sequential tracks are accessed across the data band. This reduces the need for head switches, but uses only one surface until half the disk storage capacity is consumed. A consequence of this format is the requirement for more lengthy accesses. In devices using multiple disks, it is common to access successive tracks in the same cylinder, with the same sequence of heads being used in each cylinder. By skewing each track within the cylinder it is possible to optimize track to track seek times. Such a method is shown and described in U.S. Pat. No. 5,193,036. However, when track misregistration occurs, the benefits of skewing the tracks within the cylinder can be defeated by extended cylinder increment times.

SUMMARY OF THE INVENTION

Using the present invention in the environment of a banded or zoned data band, the number of head switches are minimized as provided by the sequential track format, while meeting or exceeding the performance of conventional track formatting (data rate and access requirements). In a single disk drive, head 0 is used to access alternate tracks across the zone whereupon a switch to head 1 occurs and access of successive tracks in the opposite direction, followed by a switch to head 0 and accessing of the alternate unaccessed tracks. This causes the increment from one zone to another to be a single track access without a head switch. The zoned sequential sequence allows the servo to be nearly immune to head-to-head distance and still preserve the data rate without missing revolutions when reading a sequence of data tracks.

Several modifications of this track accessing method are used with multiple disk drives to make the increment between zones a single track access on the same data surface by the same head that accessed the final track of the prior data track zone or band These modifications are adapted to drives having data on either an odd or even number of data surfaces.

Where disk drives using several disks are formatted to sequentially switch through consecutive heads within a cylinder, the invention reverses the head access sequence of alternate cylinders. Thus cylinder increment occurs between adjacent tracks on the same data surface, which prevents thermal or other distortion induced mechanical offsets from causing longer cylinder increment distances. This improves performance by reducing track skew and cylinder skew times, thereby improving average data transfer rate performance.

BRIEF DESCRIPTION OF THE DRAWINGS

FIG. 2 is a diagram showing the conventional track access sequence in a one disk, two surface, disk drive with the sequences interrupted for brevity.

FIG. 3 is a diagram showing a sequential track format with the sequences interrupted.

FIG. 4 illustrates the zoned-sequential track sequencing of the present invention, including 2-cylinder skipping, with zones and bands interrupted.

FIG. 5 is similar to FIG. 4 and further includes the splitting of band 1 into two zones of track access.

FIG. 6 is a diagram illustrating the application of the invention to a device with an odd number of data surfaces.

FIG. 7 illustrates a typical modified form of the track sequencing of the invention.

DETAILED DESCRIPTION

Figure 1:
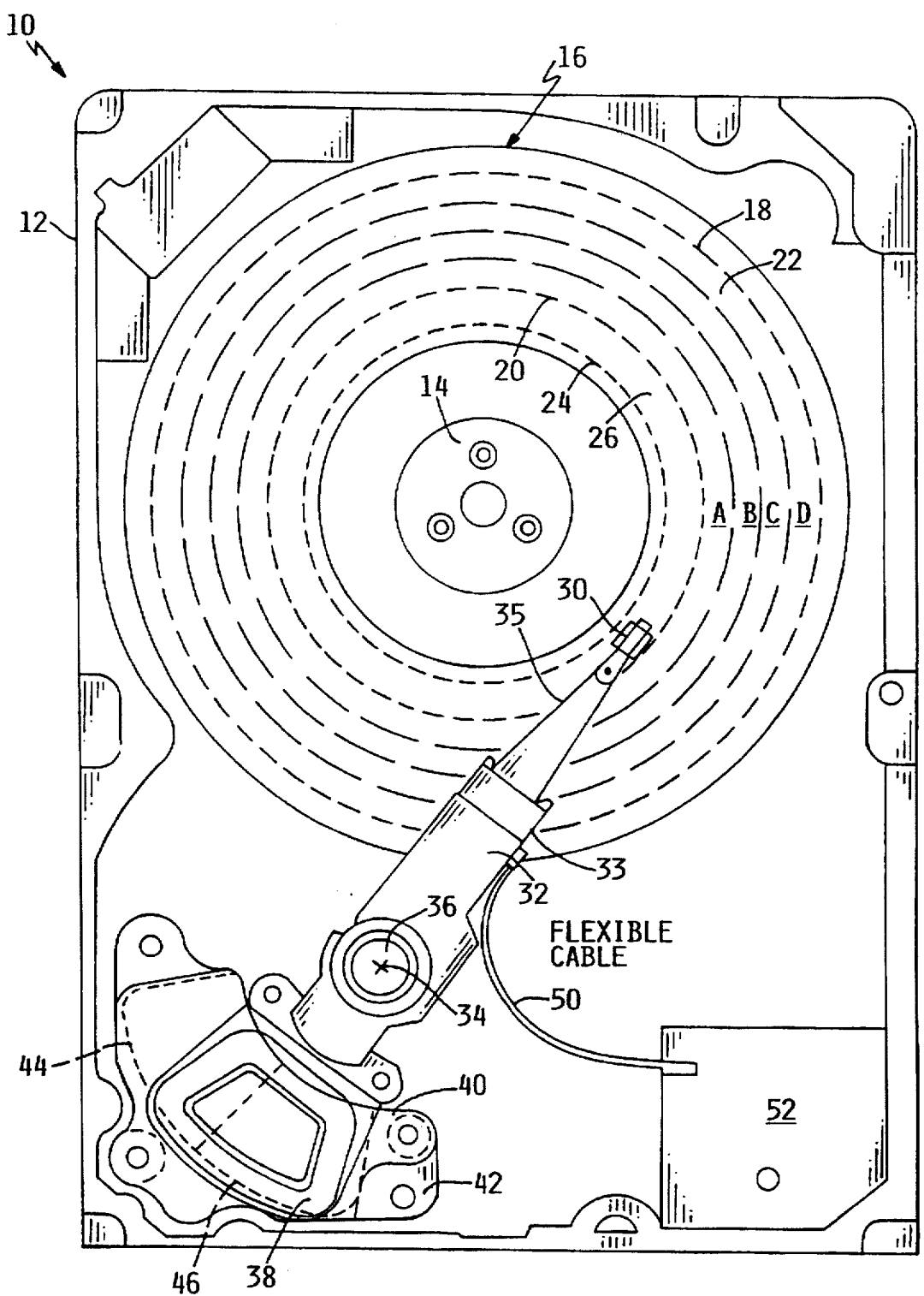
FIG. 1 is a plan view, with the cover removed, of a typical hard disk data storage device with respect to which the present invention is applicable.

FIG. 1 is a plan view of a typical small hard disk drive 10 with the cover, that completes the enclosure, removed. A cast base 12 supports a spindle motor 14 which is concentrically within the disk or disks 16. Disk 16 is secured to the exterior rotor of spindle motor 14. Disk 16 has a data zone 22 between the concentric circles 18 and 20 and has a landing region 26 toward the inner diameter between concentric circles 20 and 24. The disk also includes four zones or bands A, B, C, and D in which data is recorded at different linear densities. Thus tracks in zone A have the fewest number of data sectors per track and zone D has the greatest number of data sectors per track. When data is recorded in a single zone across the data surface, only the innermost track is recorded at the maximum or design linear density. All other tracks have a progressively reduced linear density as the track radius increases. Using multiple zones, each zone may have the maximum linear density at the innermost track of the zone, which enables each succeeding band in the radial outward direction to have a greater number of data sectors per track. A shaft 36, mounted on base 12, has an actuator 32 mounted thereabout for rotation about the axis 34. A series of arms 33 include flexures 35 which each support at the distal end, a transducer 30 for writing data onto and reading data from the data surface of disk 16. The actuator is driven by a flat voice coil 38 extending in the direction opposite the transducer supporting arms 33. Voice coil 38 is positioned in a gap in which a flux field is generated by upper yoke or pole piece 40, a lower yoke or pole piece 42 and permanent magnets 44, 46. A current pulse in one direction through voice coil 38 pivots the actuator in one pivotal direction and a current pulse in the opposite of such one current direction pivots the actuator in the direction opposite such one pivotal direction. Conductors on flexible cable 50 carry current to the voice coil 38 and sends signals to and receives signals from the transducers 30. Flexible cable 50 thus interconnects the movable voice coil 38 and transducers 30 with the electronics on card 52.

The electronic circuits on card 52 include or are connected to the controller and software that determine the track access sequences and control the head switching to implement the formatting of the data tracks and the method of drive operation.

The environment of a 3½ inch form factor provides length and width dimensions of approximately 5¾ and 4 inches and a height of about 1 inch. This provides adequate space using state of the art technology until the limits are stressed by including a stack of 8 or 10 disks. However, in the environment of a PCMCIA type II drive used in portable apparatus, the length and width of the industry standard form factor is approximately 3¼ and 2 inches and the total height is only 5 mm. With only a 5 mm height which must include base, cover, disk, and two transducer suspensions, there is little opportunity to strengthen the structure to resist shock events.

The invention teaches a method for arranging the sequence of data tracks to minimize the number of head switch operations performed. In the following descriptions, a data track will be assumed to be a sequence of data blocks (logical block addresses). In addition, for simplicity unused cylinders between zone are not included.

The sequence of data tracks in a conventional format is shown in FIG. 2 for a 1 disk, 2 surface disk drive. Using a conventional track format, each track switch requires a head switch operation, with the head 1 to head 0 also incrementing the cylinder. The sequence is track 0-head 0, track 1-head 1, track 2-head 0, etc. across the data surface from the outside diameter (OD) to the inner diameter (ID) of the data band. An alternative format, also available in some drives, is referred to as sequential track format and is illustrated in FIG. 3. Here, the tracks on one surface are sequentially accessed from the OD to the ID, following which the tracks of the second or other surface of the disk are sequentially accessed from the ID to the OD. Using sequential track format reduces the need for head switches, as each track is one cylinder move on the same head, with the exception of the last cylinder which requires a head switch. Note that if a user were to begin filling this disk drive with data, the data would only be stored on head 0 until half the capacity is utilized. Considering this case for a user or competitive bench mark, the maximum cylinder range is used, where conventional format would have only required one half the stroke for one half capacity utilization.

Using this invention, the performance may not only meet or exceed conventional track format, but also maintain the desirable reduction in head switch operations which the sequential track -format provides. The compromise solution in zoned-sequential track format is shown in the example of FIG. 4. Using zoned-sequential track format, two head switches per zone are performed. The sequence within each zone follows that shown for band 1 where tracks 0, 1, . . . , 79 require 2-cylinder ID direction incremental access movements, then tracks 80, 81, . . . ,238 are 1-cylinder OD direction movements, and finally tracks 239, 240, . . . , 317 which are 2-cylinder ID-direction movements. Thus, the tracks on the surface under head 0 are arranged in two sequences of alternate tracks and the tracks under head 1 are in a single sequence of consecutive tracks. There are an odd number of track sequences which enables the heads to be immediately adjacent the next data track zone or band when the three head access sequences are completed. Moving toward the ID , then the OD and finally toward the ID, the sequences of tracks may be accessed in any order. The initial track in the next succeeding band or zone may now be accessed without a head switch operation. Note that in the final band, access could be purely sequential, since there is no need to finish at the maximum cylinder in the final band.

The choice of track sequences that begin and end at data zone boundaries is for convenience in implementation, and to avoid changes in the data rate, such as are unavoidable in pure sequential track format. It may be considered desirable to split data bands into two or more sequences of zoned-sequential tracks, especially if they include a large number of cylinders. The use of added zones and split zones must be balanced against the need for more complex software to generate the cylinder/head sequences. It is also possible to construct scenarios where small groups of data are read, and they are at opposite ends of a range of cylinders on one head, where they would conventionally be fewer cylinders (but many heads) away. This is why it is desirable to keep the zoned-sequential cylinder range as small as possible, without requiring too many head switches.

Figure 5:
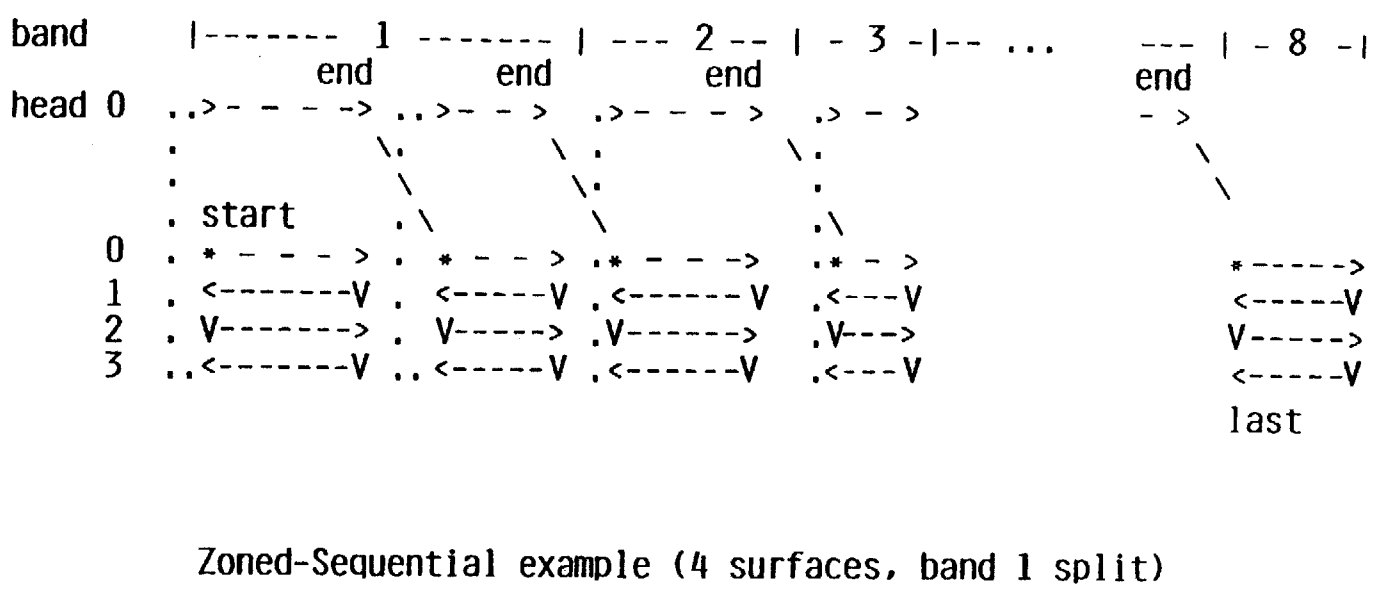

FIG. 5 is illustrative of a disk drive with multiple disks, here 2 disks and 4 data surfaces. Further, in the example, zone 1 has been split into two separate track sequences. FIG. 5 also incorporates 2-cylinder skipping, but it should be noted that any surface may be selected for the 2-cylinder skip sequence and that the data surface location of the 2-cylinder skip sequence may be changed from band to band. FIG. 6 is an example of a drive with five data surfaces that is exemplary of drives with any odd number of data surfaces. In the environment, an odd number of data sequences occur, so no 2-cylinder skipping sequence is required. Thus only one cylinder seeks and adjacent head switches are necessary to read the entire sequence of data tracks. An odd number of data surfaces may occur in drives using a dedicated servo surface or devices wherein all surfaces can not be used as a result of space or other constraints. The examples shown here illustrate some of the possible sequences, others are possible. Such a modification is shown in FIG. 7, for a six surface device where the last head is not used until all other surfaces have been filled. This sequence would, however, be less than optimal from a data rate standpoint, since data rates drop 6/5 faster, and then improve as head 5 is used from ID to OD.

Figure 8:
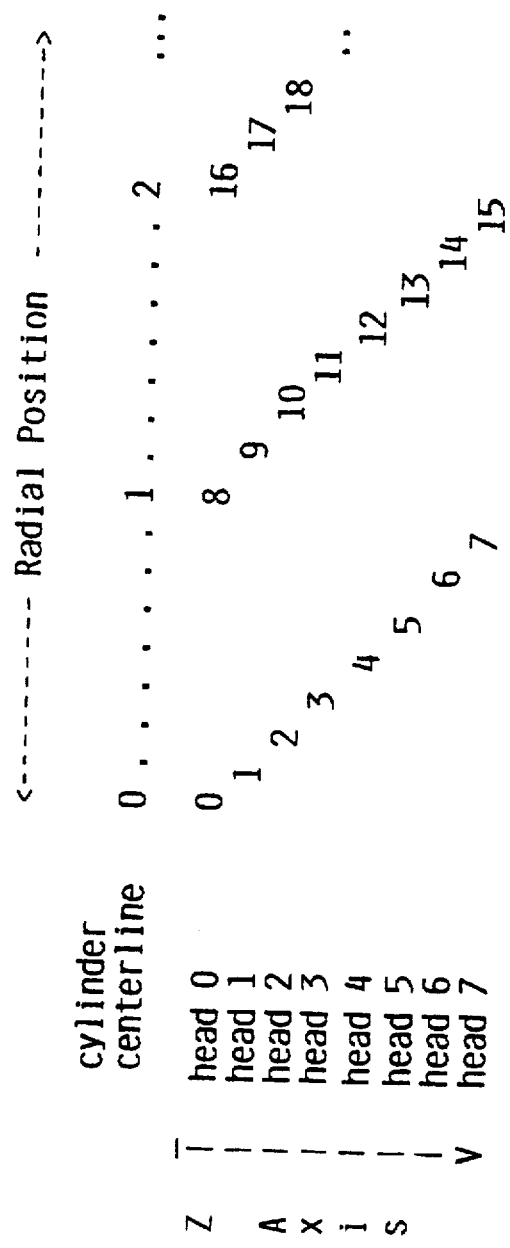
FIG. 8 shows the prior art application of fractional offset data track locations.

A further teaching of the invention is a method to arrange the sequence of heads used for consecutive data tracks to minimize the track skew and cylinder skew required by the disk drive. Track skew is the distance that a current track is skewed or rotated with respect to the preceding track to enable the current track to be read immediately following a switch from the preceding track without the time loss occasioned by an additional revolution of the disk. Similarly, cylinder skew is the distance the sectors on a cylinder are skewed from the sectors on the prior cylinder to enable continuous reading of data following a cylinder increment without the time loss of time occasioned by an additional rotation of the disk stack. Using prior art, as taught in U.S. Pat. No. 5,193,036, the sequence of heads and their respective radial position used for successive data tracks is shown in FIG. 8 for a four disk, eight surface, disk drive using a ⅛ cylinder increment per head. If there were no constant offset between data heads, then it would have the effect of making consecutive track switches be only a fraction of a track.

Figure 9:
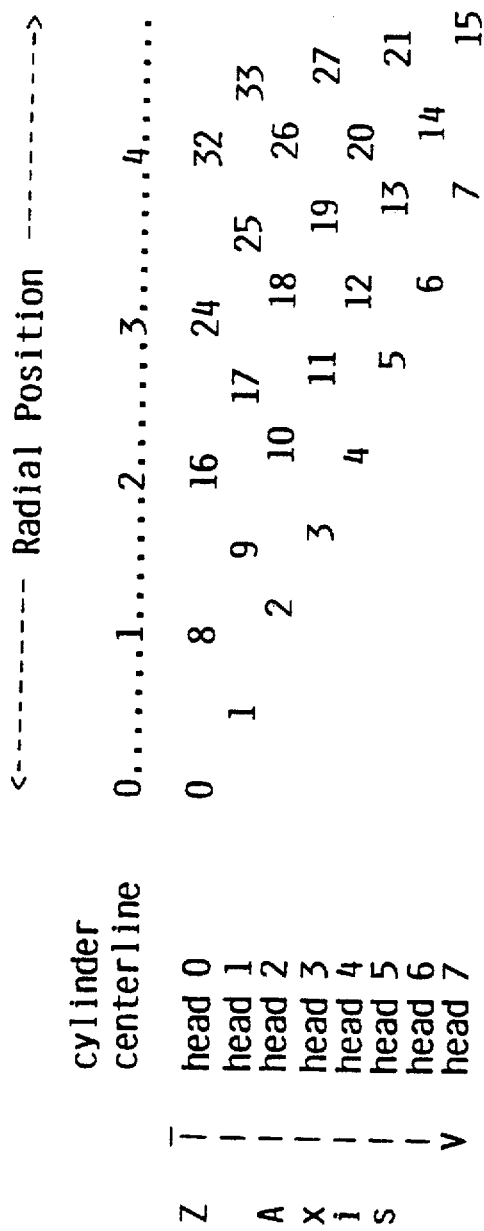
FIGS. 9 and 10 show the fractional offset track locations of FIG. 8 when subjected to a +3 track mechanical offset (FIG. 9) and a −3 track mechanical offset (FIG. 10).
Figure 10:
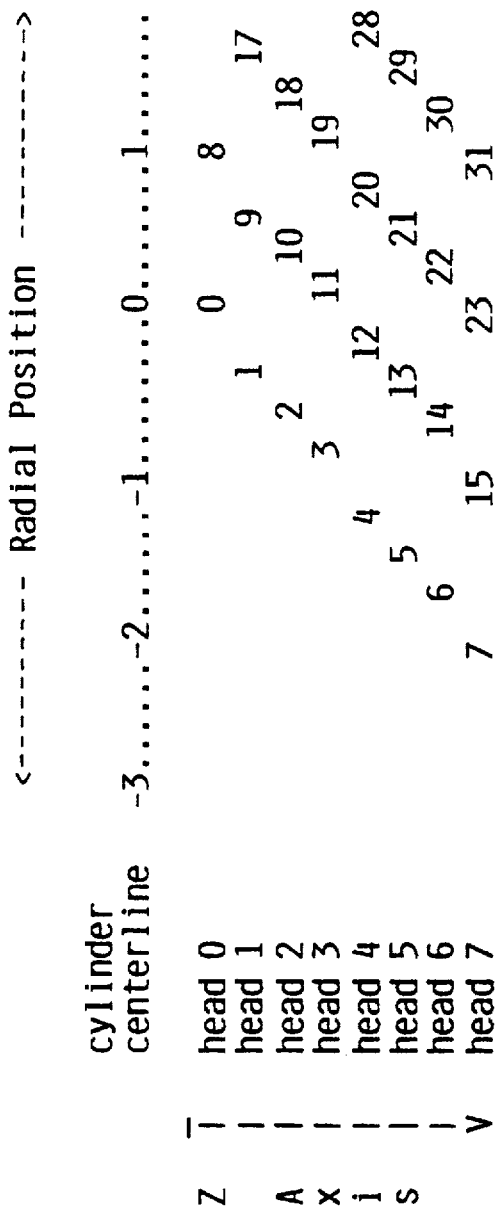

Unfortunately, the cumulative mechanical thermal/ permanent/mount distortion track misregistration effects may be on the order of 1 to 4 cylinders. The intentional ⅛ offset does, however, still provide relief of nearly one cylinder on the maximum cylinder-increment distance (head 7 to 0 switch). This effect is illustrated in FIG. 9 for +3 cylinder mechanical offset from head 0 to 7 and FIG. 10 for −3 cylinder mechanical offset. Notice that in FIG. 9 the movement required from track 7 to track 8 is −2.875 cylinders distance. In this case, the intentional ⅛ cylinder offset per head actually increased the move distance by 0.875 cylinders. In FIG. 10 the movement required from track 7 to track 8 is +3.125 cylinders distance. In this case, the intentional ⅛ cylinder offset per head decreased the move distance by 0.875 cylinders.

In one exemplary device, wherein the track pitch is 245 microinches and ⅕ cylinder intentional offset per head is used, the design distances were 177 microinches head-to-head, and 346 microinches cylinder-increment (head 0 to 7 on the next cylinder). The move times for the design distances were used to select the amount of intentional skew time for head switches (track-skew) and cylinder increment (cylinder-skew), for which the servo contribution was 0.694 ms and 1.215 ms respectively. It is also of interest to note that if the mechanical offsets exceed these design objectives, the track-skew and cylinder-skew times will be insufficient and extra revolutions are required to read/write sequentially across track boundaries.

Figure 11:
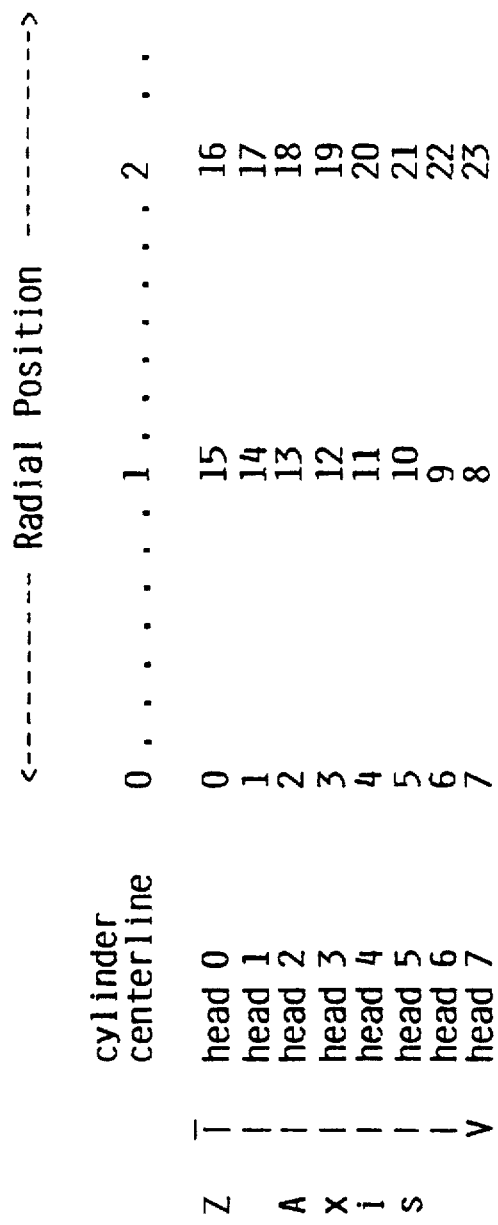
FIG. 11 illustrates the track sequencing of the present invention that causes cylinder increment distance to be a single track to track spacing.
Figure 12:
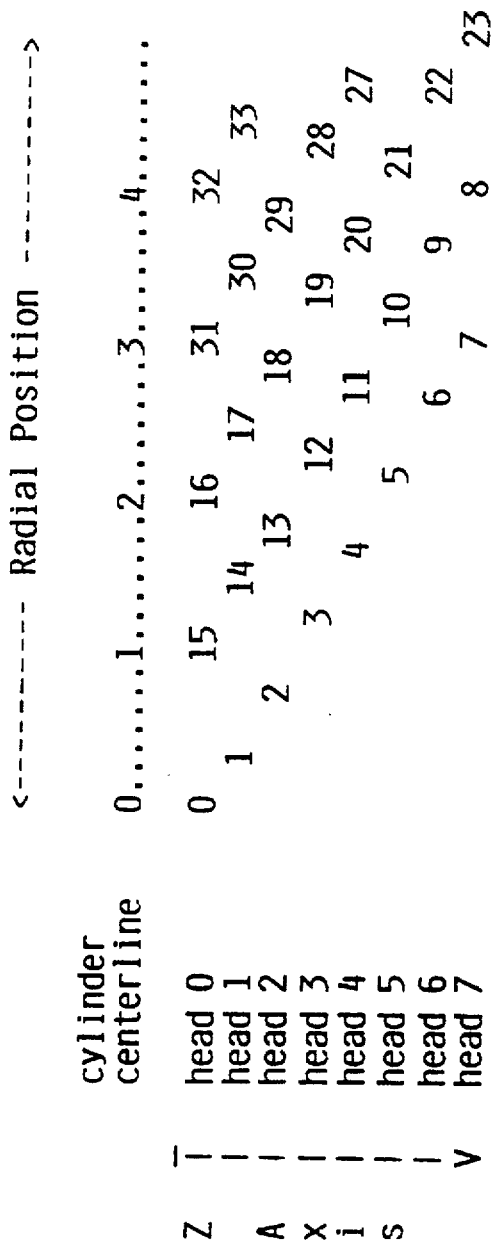
FIG. 12 shows the track sequencing of FIG. 11 when subjected to a +3 cylinder mechanical offset.

The design of FIG. 11 removes the intentional (1/number of heads) offset and reorders the sequence of heads selected for successive data tracks. The sequence of heads and their relative radial position used for data tracks is shown in FIG. 11 for a four disk, eight surface, disk drive. The head-head distance is a function only of the thermal/permanent/ mounting-distortion induced mechanical offsets. The cylinder-increment distance is always one cylinder, independent of mechanical offsets. This arrangement is made possible by altering the normal head 0, 1, . . . , 7 sequence on alternating cylinders to 7, 6, . . . , 0. Cylinder-increment movements are always one cylinder because the head is not switched at the same time, thereby avoiding the mechanical offset contributions. If a +3/−3 offset is assumed, then each head switch is +/−0.375 cylinders, but the cylinder-increment is still +1 cylinder. This is shown in FIG. 12 for a +3 offset.

Figure 13:
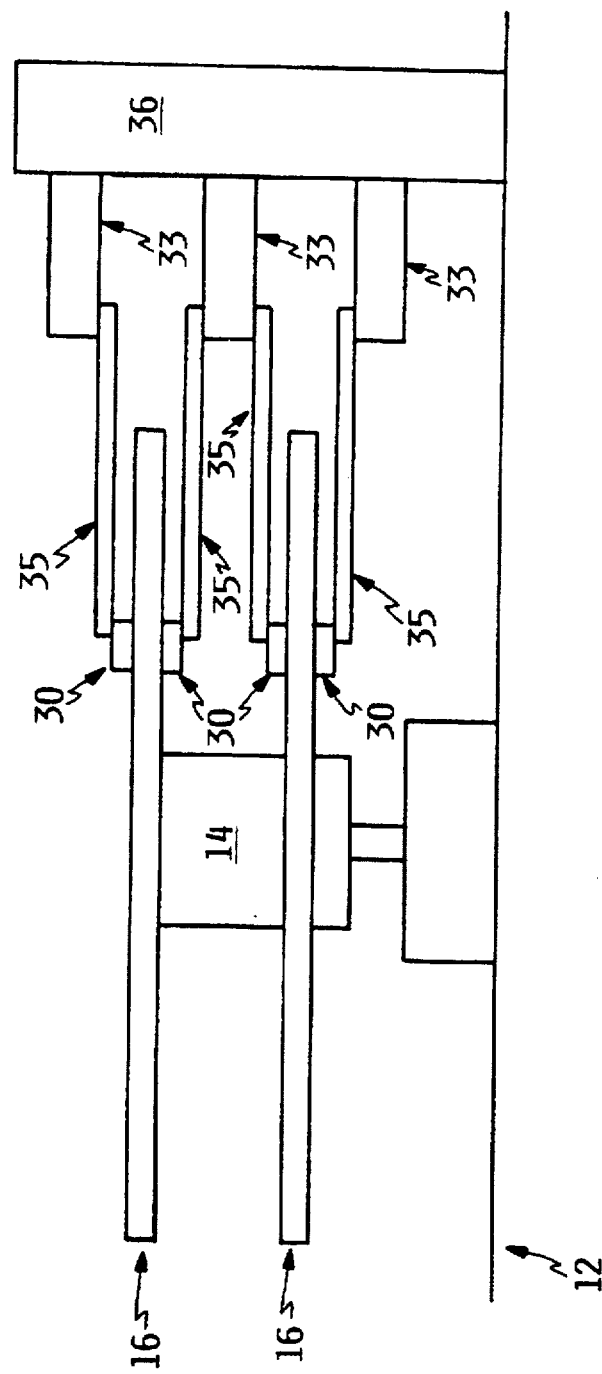
FIG. 13 is a side view, with the cover removed, of selected components of the hard disk data storage device shown in FIG. 1.

FIG. 13 is a side view, with the cover removed, of the hard disk data storage devie shown in FIG. 1. A cast base 12 supports a spindle motor 14, which is concentrically within disks 16. Disks 16 are secured to the exterior rotor of spindle motor 14. A shaft 36, mounted on base 12, has a series of arms 33, which include flexures 35, which each support at the distal end transducers 30 for writing data onto and reading data from the data surfaces of disks 16.

While the invention has been shown and described with reference to preferred embodiments, it will be understood by those skilled in the art that various changes in form and details may be made therein without departing from the spirit and scope of the invention.

What is claimed is:

1. An information storage device comprising:

a disk having a first surface and a second surface, said disk including a plurality of tracks at different radii recorded on the first and second surfaces, information stored in a first zone of selected tracks of said plurality of tracks on said disk at a first linear density, and information stored in a second zone of selected tracks of said plurality of tracks on said disk at a second linear density, wherein the first zone includes tracks recorded on both the first and second surfaces and wherein the second zone includes tracks recorded on both the first and second surfaces;

a first head that reads information from the selected tracks on said first surface on said disk;

a second head that reads information from the selected tracks on said second surface on said disk;

an actuator that moves the first and second heads from one selected track on the surface of the disk to another selected track on the surface of the disk; and a controller that causes the heads to access tracks on the respective disk surfaces, said controller establishing an odd number of track sequences within said first zone, with each sequence being on a single data surface and causes said heads to access each sequence during a move in a single direction, whereby after accessing said track sequences, the actuator has placed the heads adjacent the second zone of selected tracks, wherein two track sequences are formed on the first surface by 2-cylinder incremental access such that each track sequence is formed of alternate tracks across the surface, and wherein one track sequence is formed on the second surface to establish an odd number of track sequences on an even number of surfaces.

\* \* \* \* \*